March 18, 1969

C. A. POUX ET AL 3,432,887

MOLDING

Filed Jan. 12, 1967

INVENTOR.
C. A. POUX
P. R. DEUTSCH

BY

*Young & Quigg*
ATTORNEYS

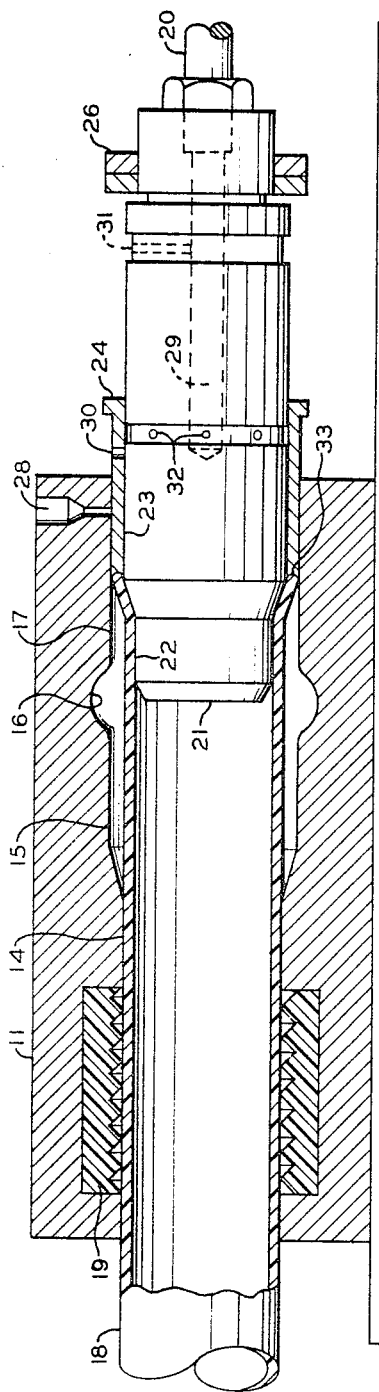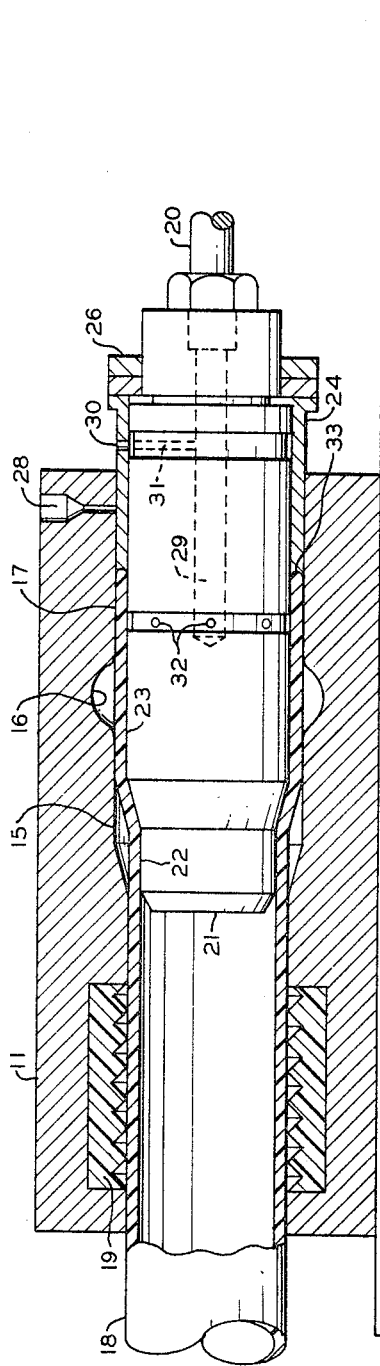

United States Patent Office 3,432,887
Patented Mar. 18, 1969

3,432,887
MOLDING
Charles A. Poux and Peter R. Deutsch, Titusville, Pa., assignors to Phillips Petroleum Company, a corporation of Delaware
Filed Jan. 12, 1967, Ser. No. 608,871
U.S. Cl. 18—19
Int. Cl. B29c 17/00; B28b 21/42
6 Claims

ABSTRACT OF THE DISCLOSURE

The end of a thermoplastic pipe is formed so as to provide for joining by blow molding a bulge in said pipe.

---

This invention relates to molding. In one aspect the invention relates to a method and apparatus for molding the end of a thermoplastic pipe into a socket or bell.

It is known that thermoplastic materials are rigid in the cold state and become plastic and malleable in the hot state between certain temperature limits.

An object of the invention is to mold thermoplastic materials.

Another object of the invention is to provide a method and apparatus for molding the end of a thermoplastic pipe into a socket or bell.

Other aspects, objects, and the advantages of the invention are apparent in the written description, the drawings, and the claims.

According to the invention, a socket comprising an annular bulge near the outer end of the socket is formed on the end of a thermoplastic pipe by an apparatus which comprises a mold having an inner surface corresponding to the shape of the desired socket comprising an annular bulge near the outer end of the socket; a mandrel, longitudinally moveable along the axis of the pipe for penetration therein, said mandrel mating with the mold inner surface, thereby conforming the pipe to the desired socket configuration; means to move the end face of the pipe into the mold, thereby partially forming the annular bulge; and means for supplying fluid under pressure to the inner surface of the pipe opposite the annular bulge, thereby fully forming the annular bulge.

In the drawings,

FIGURE 2 illustrates the side view of an apparatus for forming a socket or bell on the end of a thermoplastic pipe.

FIGURE 3 is a view similar to FIGURE 2, the apparatus being shown in the course of operation.

Figure 1:
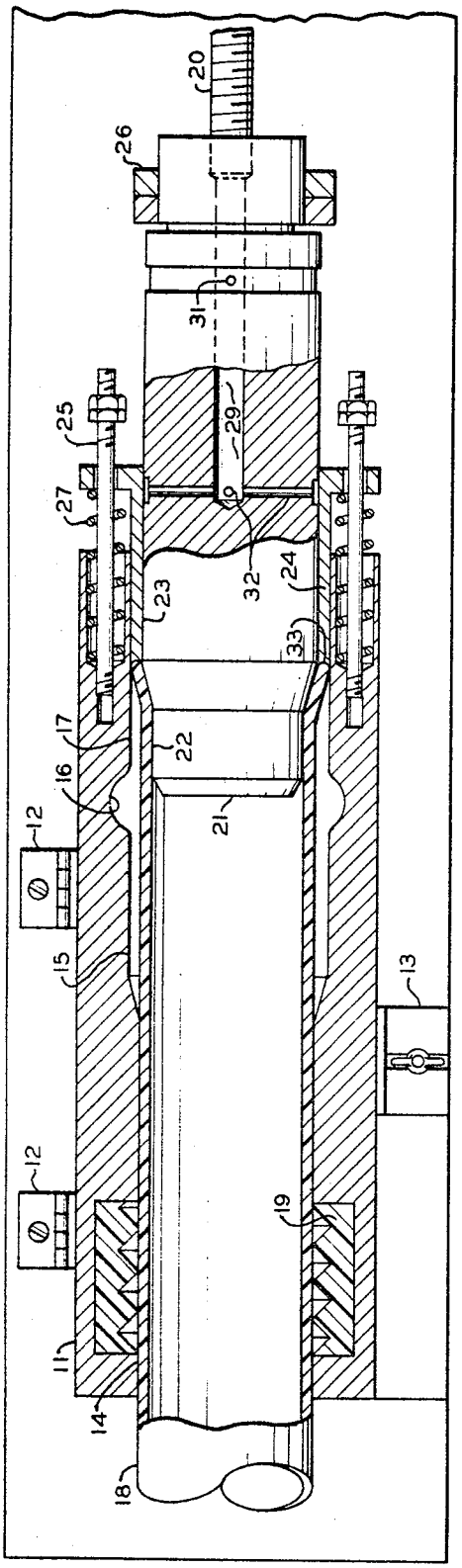
FIGURE 1 illustrates the top view of the apparatus for forming a socket or bell on the end of a thermoplastic pipe and comprising an annular bulge near the outer end of the socket.

In FIGURE 1, the top or plan view of mold 11 is shown. Mold 11 comprises a top portion, which is shown removed in FIGURE 1, and a bottom portion, as shown in FIGURE 1. The top portion of mold 11 is connected to the bottom portion of mold 11 by hinges 12 which permit mold 11 to be opened or closed and the top portion to be rotated about the axis formed by hinges 12. The top half of mold 11 is secured to the bottom half of mold 11 by fastener 13 thereby readying mold 11 for a molding cycle. Mold 11 comprises mold sections 14, 15, 16, and 17. Mold section 14 is cylindrical in shape, corresponds to the outside diameter of pipe 18, runs parallel to the longitudinal axis of pipe 18, and houses serrated holding means 19 which is provided to grasp pipe 18, thereby immobilizing pipe 18 in mold 11 when pipe 18 is inserted in mold 11 and mold 11 is closed. Mold section 14 diverges into mold section 15 which is also cylindrical in shape and is disposed about the longitudinal axis of pipe 18. Mold section 15 then diverges into mold section 16 which diverges to a maximum circumference and then converges into mold section 17 which has the same cylindrical diameter as mold section 15.

Mandrel 21 is mounted on mechanical means 20 in such a manner that it can be moved into and withdrawn from the interior of mold 11. Mandrel 21 comprises an end portion shaped to enter pipe 18 which widens into mandrel sections 22 and 23. Mandrel section 22 is cylindrical in shape and mates with mold section 14 leaving an annular recess between mandrel section 22 and mold section 14 when mandrel 21 is fully inserted into mold 11. Similarly, mandrel section 23 is cylindrical in shape and mates with mold sections 15, 16, and 17 leaving an annular recess between the mold sections and the mandrel sections when mandrel 21 is fully inserted into mold 11. The recesses between the mold and mandrel are sized to form the desired thickness of thermoplastic pipe.

Annular ring 24 is mounted on guides 25 and slides thereon during its movement within mold 11. Mandrel 21 passes through annular ring 24 and annular ring 24 remains in its outward position, as shown in FIGURE 1, until mandrel 21 is near the completion of its desired inward stroke. When mandrel 21 is near the completion of its inward stroke, collar 26 which is mounted near the end of mandrel 21 outside mold 11 contacts and engages annular ring 24, thereby forcing annular ring 24 to move forward with mandrel 21 into mold 11 during the completion of the inward stroke of mandrel 21. Springs 27, encompassing guides 25, are positioned between mold 11 and annular ring 24 and are in contact with mold 11 and annular ring 24, thereby forcing annular ring 24 to withdraw from mold 11 when mandrel 21 is withdrawn from mold 11 after the molding operation.

As the inward stroke of mandrel 21 is terminated, compressed air is admitted into interior chamber 29 of mandrel 21 through inlet 31 in mandrel 21. This operation is better illustrated in FIGURE 4.

Figure 4:
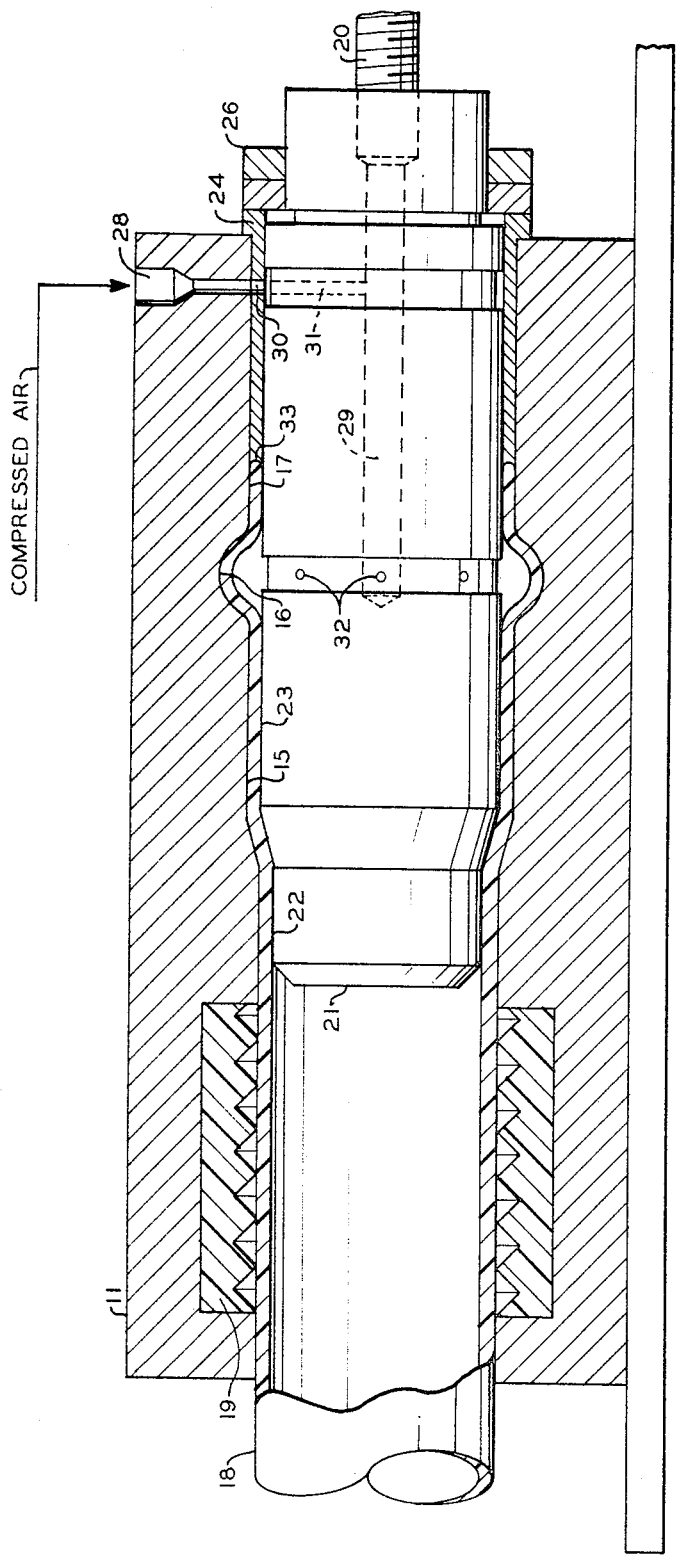
FIGURE 4 is a view similar to FIGURE 3, the apparatus being shown in the course of operation.

In FIGURE 4, as the inward stroke of mandrel 21 is terminated, compressed air is admitted through inlet 28 into interior chamber 29 of mandrel 21 by the alignment of inlet 28 with hole 30 in annular ring 24 and inlet 31 in mandrel 21. The compressed air escapes from interior chamber 29 through radial holes 32, circumscribing mandrel 21, into the annular recess between mold section 16 and mandrel section 23. Upon the removal of mandrel 21 from mold 11, the admittance of compressed air is ceased by the disalignment of inlet 28, hole 30, and inlet 31.

Mandrel 21 has a 4-inch stroke in its passage into mold 11. During its 4-inch stroke, mandrel 21 assumes three significant positions. These are shown in FIGURES 2–4.

In FIGURE 2, mandrel 21 is shown in its furthest withdrawn position from mold 11. This is the initial molding position and the ends of mandrel section 23 and annular ring 24 within mold 11 are in alignment.

In FIGURE 3, mandrel 21 is shown near the end of its inward stroke into mold 11. When mandrel 21 is in this position, collar 26, mounted near the end of mandrel 21, contacts and engages annular ring 24, thereby forcing annular ring 24 to move with it into mold 11 during the completion of the inward stroke of mandrel 21.

In FIGURE 4, mandrel 21 is shown at the end of its inward stroke into mold 11. When mandrel 21 is in this position, inlet 28, hole 30, and inlet 31 are in alignment, thereby permitting compressed air to be passed from inlet 28 into interior chamber 29 within mandrel 21 and to escape through radial holes 32.

Referring back to FIGURE 1, mandrel 21 is shown in the outward position. In operation, pipe 18 is a 2-inch, schedule 40, rigid thermoplastic pipe. The last 6 inches of pipe 18 are immersed for 20 seconds in a diethylene glycol bath heated to 365° F. Mold 11 is placed in the open position by unfastening fastener 13 and rotating the top portion about the axis formed by hinges 12 to the open position. Pipe 18 is placed into mold 11 by pushing the softened end of pipe 18 onto the end of mandrel 21 until end face 33 of pipe 18 is in contact with annular ring 24. The rigid portion of pipe 18 is then placed on serrated holding means 19. Mold 11 is closed by rotating the top portion of mold 11 about the axis formed by hinges 12 to the closed position and mold 11 is clamped shut by fastener 13. Pipe 18 is thus placed in the initial molding position, as shown in FIGURE 2.

In FIGURE 2, mandrel 21 is ready for insertion into pipe 18. Mandrel 21 is moved into pipe 18 by mechanical means 20, thereby conforming pipe 18 to mold section 17 and partially to mold section 15.

In FIGURE 3, mandrel 21 is near the end of its inward stroke into pipe 18. Collar 26, mounted near the outer end of mandrel 21, contacts and engages annular ring 24, thereby moving annular ring 24 with mandrel 21 into mold 11. During this movement, annular ring 24 contacts end face 33 of pipe 18, thereby forcing it into mold 11 and partially conforming pipe 18 with mold section 16.

In FIGURE 4, mandrel 21 has completed its inward stroke into pipe 18. Inlet 28, hole 30, and inlet 31 are in alignment permitting compressed air to be admitted into interior chamber 29 and ejected through radial holes, thereby conforming pipe 18 with mold section 16.

Pipe 18 is cooled to 180° F. by the compressed air. Mandrel 21 is then retracted from the inserted position, as shown in FIGURE 4, to the withdrawn position, as shown in FIGURE 2, by mechanical means 20. Mold 11 is opened by unfastening fastener 13 and rotating the top portion of mold 11 about the axis formed by hinges 12 to the open position. Pipe 18 with the socket and thus formed is removed from mold 11.

*Example*

Pipe 18 is a 2-inch, schedule 40, rigid PVC pipe. The last six inches of pipe 18 are immersed for 20 seconds in a diethylene glycol bath heated to 365° F. Mold 11 is opened and mandrel 21 is retracted, as described and shown in FIGURE 1, in readiness for the forming operation. The softened end of pipe 18 is pushed onto the end of mandrel 21 until annular ring 24 is contacted. The rigid portion of pipe 18 is then placed on serrated holding means 19. Mold 11 is then closed by rotating the top position about the axis of hinge means 12 to the closed position. Mold 11 is clamped shut by fastener 13. Mold 11 and pipe 18 are now in the position shown in FIGURE 2. Mandrel 21 is mechanically pushed into the end of pipe 18 by mechanical means 20. Near the end of the stroke of mandrel 21, annular ring 24 is engaged by collar 26, mounted near the end of mandrel 21, thereby forcing annular ring 24 to move with mandrel 21 during the last part of the inward stroke of mandrel 21, thus forcing end face 33 of pipe 18 into mold 11 and forcing pipe 18 to partially conform with mold section 16. As the inward stroke of mandrel 21 is terminated, compressed air under a pressure of 100 p.s.i.g. and a temperature of 75° F. is admitted from inlet 28 into interior chamber 29 of mandrel 21 by the alignment of inlet 28 with hole 30 in annular ring 24 and inlet 31 in mandrel 21. The air escapes from interior chamber 29 through radial holes 32 spaced opposite mold section 16, thereby contacting the inner surface of pipe 18 and thus forcing pipe 18 to conform to mold section 16.

Pipe 18 is cooled to 180° F. by the compressed air. Mandrel 21 is then retracted by mechanical means 20. Mold 11 is opened by unfastening fastener 13 and rotating the top portion of mold 11 about the axis formed by hinges 12 to the open position. Pipe 18 with the socket end thus formed is removed from mold 11. The forming and cooling cycle is completed in 35 seconds.

Figure 5:
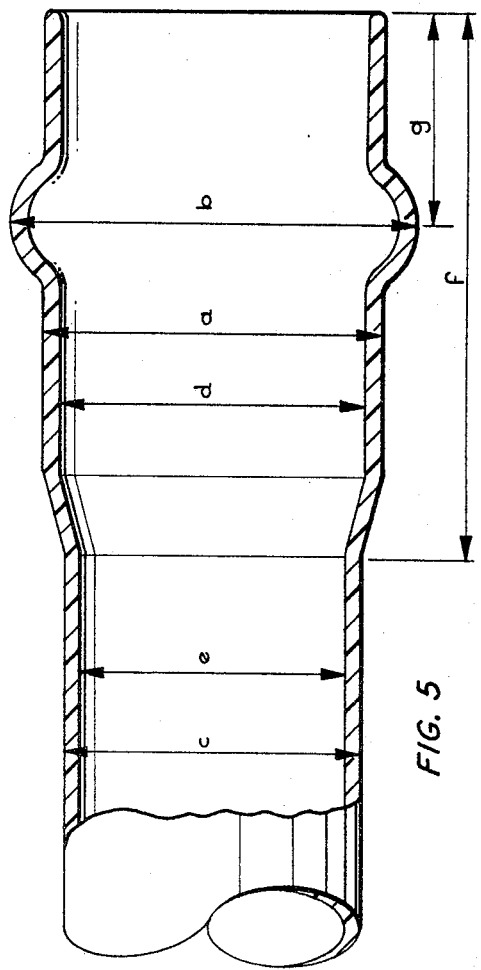
FIGURE 5 is illustrative of the dimension of the finished product.

The dimensions of pipe 18 and the formed socket comprising the annular bulge, as shown in FIGURE 5, are provided in the attached table.

*Table*

| | Inches |
|---|---|
| Outside diameter (a) of the bell-shaped socket | 2.7364 |
| Outside diameter (b) of the annular bulge in the bell-shaped socket | 3.1125 |
| Outside diameter (c) of pipe 18 | 2.375 |
| Inside diameter (d) of the bell-shaped socket | 2.380 |
| Inside diameter (e) of pipe 18 | 2.067 |
| Length (f) of the socket | 3.875 |
| Distance (g) from end face to the greatest circumference of the annular bulge | 1.000 |

Reasonable variations and modifications are possible within the scope of the invention which sets forth method and apparatus for molding of thermoplastic materials and method and apparatus for molding the end of a thermoplastic pipe into a socket or bell.

What is claimed is:

1. An apparatus for forming, on the end of a thermoplastic pipe, a socket, disposed about the longitudinal axis of the pipe and comprising an annular bulge near the outer end of the socket, comprising:

a mold having an inner surface comprising, starting from the open end, a first portion corresponding to the outer surface desired for the socket which merges into a second portion, following said first portion, said second portion corresponding to the outer surface desired for the socket which diverges into a third portion, following said second portion, said third portion corresponding to the outer surface desired for the annular bulge in said socket which converges into a fourth portion, following said third portion, said fourth portion corresponding to the outer surface desired for the socket which converges into a fifth portion, following said fourth portion, said fifth portion corresponding to the outside diameter of the pipe;

means for supporting the pipe and immobilizing one end thereof in said mold;

a mandrel, longitudinally moveable along the axis of the pipe for penetration therein, said mandrel having an end portion, shaped to enter the inside diameter of the pipe and widening into a larger portion, said end portion being adapted to penetrate first into the pipe and said larger portion being adapted to bear against the inner surface of the pipe and to exert thereon a force of radial expansion whereby said one end can be conformed, by said mandrel, to the configuration of said inner surface of said first, second, and fourth portions of said mold;

means for moving said mandrel into and out of the pipe;

means for moving the end face of the pipe from said first portion to said second portion of said mold; and means for supplying fluid under pressure between said larger mandrel portion and the inner surface of said one end of the pipe opposite said third portion of said mold.

2. The apparatus of claim 1 wherein said means for supporting the pipe and immobilizing one end thereof in said mold comprises:

hinge means permitting said mold to be opened and closed;

securing means permitting said mold to be clamped shut; and serrated means for immobilizing said one end.

3. The apparatus of claim 1 wherein said means for moving the end face of the pipe from said first portion to said second portion of said mold comprises:

an annular ring sliding on said mandrel; and
means to engage said annular ring with said mandrel near the end of the inward stroke of said mandrel whereby said annular ring can be moved with said mandrel and passed between said mandrel and said first portion of said mold.

4. The apparatus of claim 1 wherein said means for supplying fluid under pressure between said larger mandrel portion and the inner surface of said one end of the pipe opposite said third portion of said mold inner surface comprises radially placed holes in said mandrel opposite said inner surface of said one end of the pipe opposite said third portion of said mold.

5. Molding apparatus comprising, in combination, a generally cylindrical mold, a mandrel mounted for reciprocating motion within said mold between an inner position and an outer position, the mandrel, in its inner position, defining an annular cavity with the mold corresponding to a cylindrical pipe section, and a bulge corresponding to a pipe section of increased diameter, said mandrel incorporating a series of radial air passages which register with the bulge when said mandrel is in its inner position, a source of compressed air, and a valve actuated by movement of said mandrel to its inner position to supply compressed air from said source to said radial passages.

6. Molding apparatus comprising, in combination, a generally cylindrical mold, a mandrel mounted for reciprocating motion within said mold between an inner position and an outer position, the mandrel, in its inner position, defining an annular cavity with the mold corresponding to a cylindrical pipe section of reduced diameter merging into a cylindrical pipe section of increased diameter, a sleeve slideably mounted on the outer end of said mandrel within said cavity, a spring urging said sleeve outwardly, a collar on the outer end of said mandrel which is engageable with said sleeve, means for supporting a pipe within said mold with a deformable portion protruding thereinto, and means for moving said mandrel from said outer position to said inner position, thereby deforming the end of the pipe to form an enlarged end section, said collar engaging said sleeve, as the movement of the mandrel progresses, to force the sleeve into said cavity against the action of said spring and thereby force the deformable pipe section into the enlarged portion of said mold.

References Cited

UNITED STATES PATENTS

| | | | |
|---|---|---|---|
| 2,903,744 | 9/1959 | Harrison et al. | 18—19 |
| 2,977,633 | 4/1961 | Breitenstein | 18—19 |
| 3,205,535 | 9/1965 | Niessner et al. | |
| 3,248,756 | 5/1966 | Mills et al. | 18—19 |
| 3,360,826 | 1/1968 | Lorang | 18—19 |
| 3,377,659 | 4/1968 | Hucks. | |

WILLIAM J. STEPHENSON, *Primary Examiner.*